United States Patent [19]

Shiflett

[11] Patent Number: 5,643,492

[45] Date of Patent: *Jul. 1, 1997

[54] CONSTANT BOILING COMPOSITIONS OF HFC-32, HFC-125 AND HFC-134 A

[75] Inventor: Mark Brandon Shiflett, Newark, Del.

[73] Assignee: E. I. Du Pont de Nemours and Company, Wilmington, Del.

[*] Notice: The term of this patent shall not extend beyond the expiration date of Pat. No. 5,185,094.

[21] Appl. No.: 392,281

[22] Filed: Feb. 22, 1995

Related U.S. Application Data

[63] Continuation of Ser. No. 128,435, Sep. 30, 1993, abandoned, which is a continuation-in-part of Ser. No. 931,371, Aug. 18, 1992, abandoned, which is a continuation-in-part of Ser. No. 649,356, Feb. 1, 1991, Pat. No. 5,185,094, which is a continuation-in-part of Ser. No. 628,000, Dec. 17, 1990, abandoned.

[51] Int. Cl.[6] .................................................. C09K 5/04
[52] U.S. Cl. .......................... 252/67; 510/410; 62/114
[58] Field of Search .......................... 252/67, DIG. 9, 252/162, 172, 364; 62/114; 510/410

[56] References Cited

U.S. PATENT DOCUMENTS

| | | | |
|---|---|---|---|
| 4,174,295 | 11/1979 | Bargigia et al. | 252/305 |
| 4,810,403 | 3/1989 | Bivens et al. | 252/67 |
| 4,971,712 | 11/1990 | Gorski et al. | 252/69 |
| 5,185,094 | 2/1993 | Shiflett | 252/67 |
| 5,370,811 | 12/1994 | Yoshida et al. | 252/67 |

FOREIGN PATENT DOCUMENTS

| | | |
|---|---|---|
| 0430169 | 6/1991 | European Pat. Off. . |
| 0451692 | 10/1991 | European Pat. Off. . |
| 64-79288 | 3/1989 | Japan . |
| 1-108291 | 4/1989 | Japan . |

OTHER PUBLICATIONS

McLinden & Didion's article "Quest for Alternatives" (ASHRAE Journal, Dec. '87).

Vinyard, Sand & Statt's article "Selection of Ozone–Safe, Nonazeotropic Refrigerant Mixtures for Capacity Modulation in Residential Heat Pumps" (ASHRAE Transactions 1989, vol. 95, Part 1) no month available.

Extract fr.OakRidge Nat.Lab. "Environmental, Health, and CFC Substitution Aspects of the Ozone Depletion Issue", Apr. 1989.

*Primary Examiner*—Christine Skane

[57] ABSTRACT

Ternary mixtures of pentafluoroethane, difluoromethane and tetrafluoroethane are useful as refrigerants, aerosol propellants, heat transfer media, gaseous dielectrics, fire extinguishing agents, expansion agents for polyolefins and polyurethanes, and as power cycle working fluids.

1 Claim, No Drawings

CONSTANT BOILING COMPOSITIONS OF HFC-32, HFC-125 AND HFC-134 A

CROSS-REFERENCE TO RELATED APPLICATION

This is a continuation of application Ser. No. 08/128,435 filed on Sep. 30, 1993, now abandoned, which is a continuation-in-part of U.S. application Ser. No. 07/931,371 filed on Aug. 18, 1992, abandoned, which is a continuation-in-part of U.S. application Ser. No. 07/649,356 filed on Feb. 1, 1991, now U.S. Pat. No. 5,185,094 granted Feb. 9, 1993, which is a continuation-in-part of U.S. application Ser. No. 07/628,00 filed on Dec. 17, 1990, abandoned.

FIELD OF THE INVENTION

This invention relates to constant boiling mixtures for use as refrigerants, aerosol propellants, heat transfer media, gaseous dielectrics, fire extinguishing agents, blowing or expansion agents for polymers such as polyolefins and polyurethanes and as power cycle working fluids. More particularly, it relates to constant boiling mixtures of fluorinated hydrocarbons. Specifically, this invention relates to the use of mixtures of pentafluoroethane (HFC-125), difluoromethane (HFC-32) and tetrafluoroethane HFC-134 and/or HFC-134a) as replacements for Refrigerant 502 (R-502), a commercial binary azeotrope of chlorodifluoromethane (HCFC-22) and chloropentafluoroethane (CFC-115) and the like that have been used as the refrigerant in numerous commercial applications.

BACKGROUND OF THE INVENTION

Recently the long-term environmental effects of chlorofluorocarbons have come under substantial scientific scrutiny. It has been postulated that these chlorine-containing materials decompose in the stratosphere, under the influence of ultraviolet radiation, to release chlorine atoms. Chlorine atoms are theorized to undergo chemical reaction with the ozone layer in the stratosphere. This reaction could deplete or at least reduce the stratospheric ozone layer, thus permitting harmful ultraviolet radiation to penetrate the earth's protective ozone layer. A substantial reduction of the stratospheric ozone layer could have a serious deleterious impact on the quality of life on earth.

Refrigerant 502, the azeotropic mixture of about 47–50 weight percent HCFC-22 and 53–50 weight percent CFC-115 (the azeotrope is composed of 48.8 weight percent HCFC-22 and 51.2 weight percent CFC-115) has long been used as the refrigerant in most of the country's supermarket refrigeration cases. However, since CFC-115 is a chlorofluorocarbon compound which is being phased out by the year 2000, the industry is required to replace Refrigerant 502 with environmentally safer fluorinated hydrocarbons.

The tetrafluoroethanes (HFC-134 and its isomer HFC-134a) have been mentioned as possible substitutes. However, the low vapor pressures (relatively high boiling points) limit the refrigeration capacity of these compounds alone, making them undesirable in R-502 applications. Also, pentafluoroethane (HFC-125) has been suggested as a replacement for R-502, but its energy efficiency (heat removed by the evaporator divided by the power to compress the vapor) is 10% lower than R-502. Consequently, newly designed equipment would be required to achieve the refrigeration capacity and energy efficiency currently needed for these supermarket applications.

Mixtures of environmentally safe materials might also be used if the desired combination of properties could be attained in a simple (not constant boiling) mixture. However, simple mixtures create problems in the design and operations of the equipment used in refrigeration systems. These problems result primarily from component separation or segregation in the vapor and liquid phases.

Azeotropic or constant boiling mixtures of two or more components, where the composition of the vapor and liquid phases are substantially the same at the temperatures and pressures encountered in the refrigeration cycle, would appear to be the answer.

It is an object of the present invention to provide a substantially constant boiling composition of at least two hydrofluorocarbons that is low boiling, is non-flammable, and suitable for use as a refrigerant, aerosol propellant, a heat transfer medium, a gaseous dielectric, a fire extinguishing agent, an expansion or blowing agent for polymers and as a power cycle working fluid.

It is a further aspect of the present invention is to provide a working fluid for air conditioners, heat pumps and the like, consisting essentially of non-flammable quantities of difluoromethane, pentafluoroethane and at least one tetrafluoroethane.

SUMMARY OF THE INVENTION

According to the present invention, a ternary fluorocarbon mixture has been discovered that comprises about 5–90 weight percent pentafluoroethane, $CF_3$—$CHF_2$, also known as HFC-125, about 5–90 weight percent difluoromethane, $CH_2F_2$, also known as HFC-32, and about 5–90 weight percent tetrafluoroethane, $CF_3$—$CH_2F$ and $CHF_2$—$CHF_2$, also known as HFC-134a and HFC 134, that is suitable for the aforementioned uses, particularly for use in the refrigeration cases found in supermarkets. The substantially constant boiling compositions comprise about 5–59 weight percent HFC-125, 5–59 weight percent HFC-32 and about 5–35 weight percent of at least one of HFC-134 and HFC-134a. As working fluid in air conditioners, heat pumps and the like, the range for HFC-134a is anywhere from about 5–90 weight percent; and, as shown in Table 3, from 15–70 weight percent in mixtures with HFC-125 and HFC-32 were quite satisfactory. As for HFC-134, a range of about 5–45 weight percent, preferably 15–45 weight percent as shown in Table 2, is quite satisfactory.

The compositions of this invention are particularly useful in refrigeration applications since they maintain their stability and their azeotrope-like properties at temperatures of −30° F. to 115° F. and pressures of 14 psia to 350 psia as shown in the examples hereinafter. As a matter of information, the compositions of this invention may be used successfully at temperatures as low as −50° F. to temperatures as high as 300° F.

The novel mixture compositions of the instant invention exhibit differences in dew and bubble points. However, these differences can increase the overall energy efficiency of the refrigeration cycle and be beneficial to refrigeration equipment designers.

There are other ternary and higher blends as shown in Table 2 having desirable characteristics that could be formulated by those skilled in the art from the halocarbons defined and exemplified herein. Another blend that may be formulated for the purposes of this invention is HFC-125/HFC-134a/HFC-134/HFC-32.

The objective of this description is not to identify every possible blend composition, but to illustrate our discovery of the unexpected properties that the ternary (or higher) blends can take on, depending on the components and the chosen proportions.

For the purpose of this discussion, "near-azeotropic" is intended to mean essentially azeotropic or essentially constant boiling. In other words, included within the meaning of these terms are variable degrees of near-azeotropic behavior depending on the proportions of the components. As is well recognized in this art, there is a range of compositions which contain the same components as the near-azeotrope and demonstrate equivalent properties at other temperatures and pressures, but will behave essentially as those mentioned.

The novel ternary mixtures may be used to produce refrigeration by condensing the mixtures and thereafter evaporating the condensate in the vicinity of a body to be cooled.

The novel mixtures may also be used to produce heat by condensing the refrigerant in the vicinity of the body to be heated and thereafter evaporating the refrigerant.

The use of non-azeotropic mixtures that exhibit differences in dew and bubble points can be used with counter current heat exchangers to offer potential energy efficiency advantages which pure component and azeotropic and near azeotropic mixtures may not exhibit.

The novel mixtures have zero ozone depletion potentials (ODP) compared with Refrigerant 502. The ODP are provided in Table 1 for comparison.

The novel mixtures have little effect on the global warming potential. The halocarbon global warming potentials (HGWP) of the mixtures/components are listed in Table 1 and R-502 is provided for comparison.

TABLE 1

| Refrigerant | Chemical Formula | ODP | HGWP |
|---|---|---|---|
| R-502 | $CHClF_2/CClF_2CF_3$ | .25 | 4.75 |
| HFC-125 | $CHF_2CF_3$ | .0 | .84 |
| HFC-134a | $CF_3CH_2F$ | .0 | .29 |
| HFC-134 | $CHF_2CHF_2$ | .0 | .28 |
| HFC-32 | $CH_2F_2$ | .0 | .11 |

Also, the mixtures can be formulated such that the initial composition or the composition during leakage remains nonflammable. By "nonflammable" is meant a gas mixture in air which will not burn when subjected to a spark igniter according to Flammability Test Method ASTM-E681-85.

It should be understood that one or more of the compounds shown in Table 2 can be substituted or combined with the substantially constant boiling ternary mixtures of this invention to provide additional substantially constant boiling mixtures for similar uses while adding advantageous properties unique to the added component(s).

TABLE 2

| Nomenclature | Chemical Formula |
|---|---|
| HFC-22 | $CHClF_2$ |
| HFC-143a | $CH_3CF_3$ |
| HFC-161 | $CH_2FCH_3$ |
| FC-218 | $CF_3CF_2CF_3$ |
| Propane | $CH_3CH_2CH_3$ |
| HFC-23 | $CHF_3$ |
| HFC-227ea | $CF_3CHFCF_3$ |

The invention will be more clearly understood by referring to the examples which follow.

EXAMPLES 1–12

Evaluation of the refrigeration properties of the novel ternary mixtures of the invention versus Refrigerant 502 are shown in Table 3. The data were generated on a one-ton basis, i.e., based on the removal of heat from a space at the rate of 12,000 BTU/hr.

TABLE 3

Comparison of Refrigeration Performance

| | Conditions | | | | | | | | |
|---|---|---|---|---|---|---|---|---|---|
| | Evaporator | | | Condenser | | | | Net Refrig. | |
| | Temp. | | | Temp. | | | | | |
| Refrigerants | In (°F.) | Out (°F.) | Pres. (psia) | In (°F.) | Out (°F.) | Pres. (psia) | C.O.P. | Effect (BTU/lb) | Example |
| R-502 | −30 | −30 | 24.0 | 115 | 115 | 281.9 | 1.89 | 46.7 | Control |
| Mixtures 125/134a/32 (wt. %) | | | | | | | | | |
| 45/45/10 | −34 | −25 | 18.5 | 119 | 112 | 264.3 | 1.93 | 68.5 | 1 |
| 75/15/10 | −32 | −28 | 24.5 | 117 | 113 | 318.3 | 1.80 | 50.0 | 2 |
| 18/57/25 | −36 | −25 | 18.6 | 120 | 111 | 270.1 | 1.97 | 73.2 | 3 |
| 25/25/50 | −34 | −27 | 26.6 | 117 | 112 | 350.3 | 1.86 | 81.7 | 4 |
| 50/30/10 | −34 | −26 | 21.1 | 118 | 112 | 286.9 | 1.87 | 74.2 | 5 |
| 10/70/20 | −36 | −25 | 16.9 | 120 | 111 | 244.5 | 2.01 | 73.1 | 6 |
| Mixtures 125/134/32 (wt. %) | | | | | | | | | |
| 45/45/10 | −38 | −23 | 16.5 | 121 | 109 | 250.1 | 1.95 | 61.7 | 7 |
| 75/15/10 | −33 | −27 | 24.0 | 117 | 113 | 315.7 | 1.80 | 50.8 | 8 |
| 18/57/25 | −39 | −21 | 16.0 | 123 | 108 | 246.7 | 2.01 | 77.9 | 9 |

TABLE 3-continued

Comparison of Refrigeration Performance

| | Conditions | | | | | | | | |
|---|---|---|---|---|---|---|---|---|---|
| | Evaporator | | | Condenser | | | | Net Refrig. | |
| | Temp. | | | Temp. | | | | | |
| Refrigerants | In (°F.) | Out (°F.) | Pres. (psia) | In (°F.) | Out (°F.) | Pres. (psia) | C.O.P. | Effect (BTU/lb) | Example |
| 25/25/50 | −36 | −25 | 24.5 | 119 | 111 | 337.9 | 1.87 | 84.2 | 10 |
| 50/30/10 | −36 | −25 | 19.7 | 119 | 111 | 281.7 | 1.87 | 56.1 | 11 |
| 10/70/20 | −39 | −21 | 13.6 | 123 | 108 | 216.8 | 2.07 | 78.8 | 12 |

"Coefficient of Performance" (COP) is the ratio of net refrigeration effect to the compressor work. It is a measure of refrigerant energy efficiency.
"Net Refrigeration Effect" is the change in enthalpy of the refrigerant in the evaporator, i.e., the heat removed by the refrigerant in the evaporator.

For a refrigeration cycle typified by the above conditions, the COP of the mixtures are either significantly higher or essentially the same as R-502. These mixtures exhibit temperature glides (difference in inlet and exit temperature) through the condenser and evaporator. These glides in temperature vary from 3° to 18° F., depending on the composition of the mixture. In the case of an azeotrope the temperature glide is 0, in the case of a near-azeotropic mixture a temperature glide may be as much as 10° F. However, these temperature glides should not pose any significant problems to equipment manufacturers. In fact, higher temperature glides may be useful to aid designers increase the energy efficiency of their machines. Also, the mixtures have much more capacity than R-502, due to their higher vapor pressures.

Additives such as lubricants, corrosion inhibitors, stabilizers, dyes and other appropriate materials may be added to the novel compositions of the invention for a variety of purposes provided they do not have an adverse influence on the composition for their intended applications.

In addition to refrigeration applications, the novel constant boiling compositions of the invention are also useful as: aerosol propellants, heat transfer media, gaseous dielectrics, fire extinguishing agents, expansion agents for polymers such as polyolefins and polyurethanes, and power cycle working fluids.

EXAMPLE 13

A phase study was made on pentafluoroethane, tetrafluoroethane and difluoromethane to verify the fractionation and change in vapor pressure during a phase change from liquid to vapor.

Blends were prepared in 75 cc stainless steel cylinders consisting of pentafluoroethane, 1,1,1,2-tetrafluoroethane, and difluoromethane. The cylinders were agitated with a magnetic stirrer and submerged in a constant temperature bath at 23.8° C. The vapor pressure was constantly measured using a pressure transducer and the vapor composition was sampled at various times during the experiment and analyzed using a standard gas chromatography method. Initial and final liquid concentrations were also analyzed by gas chromatography. Initial liquid (IQ), final liquid (FQ), vapor composition and vapor pressure data are recorded in Tables 4, 5 and 6.

TABLE 4

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 48.8 | 17.3 | 33.9 | 207.2 | 0 |
| 1 | 6.3 | 51.0 | 4.3 | 44.6 | 206.0 | 0.6 |
| 2 | 12.5 | 51.8 | 7.1 | 41.1 | 204.8 | 1.2 |
| 3 | 18.8 | 50.9 | 8.6 | 40.5 | 203.6 | 1.7 |
| 4 | 25.0 | 50.9 | 9.5 | 39.7 | 202.2 | 2.4 |
| 5 | 31.3 | 50.6 | 10.7 | 38.7 | 200.5 | 3.2 |
| 6 | 37.5 | 50.6 | 11.2 | 38.1 | 198.5 | 4.2 |
| 7 | 43.8 | 50.6 | 12.0 | 37.5 | 196.5 | 5.2 |
| 8 | 50.4 | 50.6 | 12.2 | 37.2 | 193.7 | 6.5 |
| FQ | 50.4 | 49.4 | 22.0 | 28.6 | 193.7 | 6.5 |

TABLE 5

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 33.9 | 38.2 | 27.9 | 188.4 | 0 |
| 1 | 8.3 | 41.2 | 18.8 | 39.5 | 184.1 | 2.3 |
| 2 | 16.7 | 40.9 | 21.9 | 37.3 | 180.8 | 4.0 |
| 3 | 25.0 | 40.2 | 24.0 | 35.7 | 178.3 | 5.4 |
| 4 | 33.0 | 38.9 | 25.3 | 35.0 | 174.0 | 7.6 |
| 5 | 41.8 | 37.4 | 30.3 | 32.3 | 171.2 | 9.1 |
| 6 | 51.0 | 37.3 | 32.5 | 30.2 | 168.7 | 10.4 |
| FQ | 51.0 | 30.2 | 47.0 | 22.7 | 168.7 | 10.4 |

TABLE 6

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 18.7 | 56.4 | 24.8 | 173.2 | 0 |
| 1 | 1.7 | 26.5 | 36.9 | 36.6 | 172.1 | 0.4 |
| 2 | 6.2 | 25.5 | 37.5 | 37.0 | 169.7 | 1.4 |
| 3 | 10.6 | 25.3 | 38.5 | 36.2 | 164.5 | 2.4 |
| 4 | 15.1 | 24.8 | 40.2 | 35.5 | 162.5 | 3.5 |
| 5 | 19.6 | 24.2 | 41.6 | 34.3 | 160.1 | 4.5 |
| 6 | 24.4 | 24.4 | 40.9 | 34.6 | 158.4 | 5.7 |
| 7 | 28.9 | 23.8 | 42.8 | 31.3 | 155.6 | 7.1 |
| 8 | 33.3 | 22.8 | 45.9 | 31.3 | 154.0 | 8.4 |
| 9 | 37.8 | 23.1 | 45.7 | 31.2 | 151.3 | 9.8 |
| 10 | 42.2 | 23.4 | 46.3 | 31.6 | 149.0 | 11.2 |

TABLE 6-continued

| Sample | Percent Loss | Composition (wt. %) | | | Vapor Pressure | |
|---|---|---|---|---|---|---|
| | | HFC-125 | HFC-134a | HFC-32 | (psia) | (% Change) |
| 11 | 46.7 | 20.8 | 49.7 | 29.5 | 146.3 | 12.8 |
| 12 | 48.9 | 21.1 | 51.8 | 27.1 | 144.1 | 13.8 |
| 13 | 54.4 | 21.4 | 51.3 | 27.3 | 140.2 | 15.8 |
| FQ | 54.4 | 12.7 | 73.1 | 14.2 | 140.2 | 15.8 |

These data (Tables 4–6) demonstrate that with more than 50% of the original charge depleted, the vapor pressure has changed less than 16% in all cases. The degree fractionation depends on the tetrafluoroethane concentration and can be adjusted to give small changes in vapor pressure. Mixtures containing 35 wt. % of 1,1,1,2-tetrafluoroethane (HFC-134a) or less are considered substantially constant boiling since the vapor pressure will change less than 10% at 50% leakage. Mixtures containing greater than 35 wt. % of 1,1,1,2-tetrafluoroethane are considered non-azeotropic as the vapor pressure has changed more than 10% at 50% leakage. These mixtures could still be quite useful in many applications, especially those that require very small sizes. At small charge sizes, recharging the mixture due to vapor leakage to return to the desired composition does not pose any significant problem. Substituting 1,1,2,2-tetrafluoroethane (HFC-134) for HFC-134a would be expected to give similar results at lower HFC-134 concentrations.

These data also demonstrate that, even though the mixtures fractionate and the vapor pressure decreases, the difluoromethane concentration in both the liquid and vapor phases during leakage also decreases. Therefore, the blend will not become flammable if the initial concentration is nonflammable. Similar behavior is predicted for the mixture containing HFC-134 instead of HFC-134a.

EXAMPLE 14

In the phase studies made on mixtures of pentafluoroethane, tetrafluoroethane and difluoromethane in Example 13 to verify the fractionation and change in vapor pressure during a phase change from liquid to vapor, the following starting compositions were used:

1) 48.8 wt. % HFC-125, 17.3 wt. % HFC-134a, 33.9 wt. % HFC-32

2) 33.9 wt. % HFC-125, 38.2 wt. % HFC-134a, 27.9 wt. % HFC-32

3) 18.7 wt. % HFC-125, 56.4 wt. % HFC-134a, 24.8 wt. % HFC-32.

The data obtained in Example 13 was used to calculate the fractionation and change in vapor pressure during the liquid to vapor phase change for the following starting compositions:

1) 30.0 wt. % HFC-125, 10.0 wt. % HFC-134a, 60.0 wt. % HFC-32

2) 60.0 wt. % HFC-125, 10.0 wt. % HFC-134a, 30.0 wt. % HFC-32

3) 70.0 wt. % HFC-125, 20.0 wt. % HFC-134a, 10.0 wt. % HFC-32

4) 70.0 wt. % HFC-125, 10.0 wt. % HFC-134a, 20.0 wt. % HFC-32

5) 90.0 wt. % HFC-125, 5.0 wt. % HFC-134a, 5.0 wt. % HFC-32.

The results are shown in Tables 7–11

TABLE 7

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 30.0 | 10.0 | 60.0 | 227.2 | 0 |
| 1 | 0 | 30.3 | 5.2 | 64.5 | 227.0 | 0 |
| 2 | 50 | 30.5 | 7.7 | 61.8 | 221.8 | 2.3 |
| FQ | 50 | 29.5 | 14.5 | 56.0 | 221.8 | 2.3 |

TABLE 8

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 60.0 | 10.0 | 30.0 | 215.6 | 0 |
| 1 | 0 | 59.9 | 5.6 | 34.5 | 215.6 | 0 |
| 2 | 50 | 60.8 | 8.1 | 31.1 | 208.5 | 3.3 |
| FQ | 50 | 59.6 | 14.3 | 26.1 | 208.5 | 3.3 |

TABLE 9

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 70.0 | 20.0 | 10.0 | 186.2 | 0 |
| 1 | 0 | 74.8 | 12.4 | 12.8 | 186.2 | 0 |
| 2 | 50 | 72.4 | 17.2 | 10.4 | 175.7 | 5.6 |
| FQ | 50 | 65.1 | 27.2 | 7.7 | 175.7 | 5.6 |

TABLE 10

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 70.0 | 10.0 | 20.0 | 208.2 | 0 |
| 1 | 0 | 70.4 | 5.8 | 23.8 | 208.2 | 0 |
| 2 | 50 | 71.1 | 8.3 | 20.7 | 200.8 | 3.6 |
| FQ | 50 | 69.1 | 14.1 | 16.8 | 200.8 | 3.6 |

TABLE 11

| Sample | Percent Loss | Composition (wt. %) | | | Vapor Pressure | |
|---|---|---|---|---|---|---|
| | | HFC-125 | HFC-134a | HFC-32 | (psia) | (% Change) |
| IQ | 0 | 90.0 | 5.0 | 5.0 | 197.2 | 0 |
| 1 | 0 | 90.7 | 3.1 | 6.2 | 197.2 | 0 |
| 2 | 50 | 90.7 | 4.2 | 5.1 | 193.4 | 1.9 |
| FQ | 50 | 89.0 | 7.0 | 4.0 | 193.4 | 1.9 |

The information in Tables 7–11 demonstrates that with 50% of the original charge depleted, the vapor pressure changes less that 6% in all cases. Since these data were calculated using ternary mixtures containing from 30 to 90 weight percent HFC-125 and vapor pressures from about 175 psia to about 230 psia, it can be concluded that mixtures consisting essentially of 5–90 weight percent pentafluoroethane, 5–59 weight percent difluoromethane and 5–35 weight percent 1,1,1,2-tetrafluoroethane having a vapor pressure of about 175 psia to about 230 psia at 23.8° C. are substantially constant boiling.

EXAMPLE 15

The ozone depletion potential is based on the ratio of calculated ozone depletion in the stratosphere resulting from the emission of a compound compared to the ozone depletion potential resulting from the same ratio of emission of CFC-11 which is set at 1.0. A method of calculating ozone depletion potential is described in "The Relative Efficiency of a Number of Halocarbons for Destroying Stratospheric Ozone", by D. J. Wuebbles, Lawrence Livermore Laboratory Report UCID-18924, January, 1981, and "Chlorocarbon Emission Scenarios: Potential Impact on Stratospheric Ozone", by D. J. Wuebbles, Journal Geophysics Research, 88, 1433–1443, 1983.

HFC-125 ($CF_3CF_2H$), HFC-134a ($CF_3CFH_2$) or HFC-134 ($CF_2HCF_2H$), and HFC-32 ($CF_2H_2$) contain no chlorine atoms; therefore, they have no ozone depletion potential (0ODP).

The halocarbon global warming potentials (HGWP) of the fluorocarbons were determined using the method described in the "Scientific Assessment of Stratospheric Ozone: 1989", sponsored by the U. N. Environment Programme. The GWP is a phenomenon that occurs in the stratosphere. It is calculated using a model that incorporates parameters based on the agent's atmospheric lifetime and its infra-red cross-section or its infra-red absorption strength per mole as measured with an infra-red spectrophotometer.

I claim:

1. A substantially constant boiling mixture consisting essentially of a substantially constant boiling composition consisting of 5–90 weight percent pentafluoroethane, 5–59 weight percent difluoromethane, and 5–35 weight percent 1,1,1,2-tetrafluoroethane having a vapor pressure of about 186 to about 227 psia at 23.8 ° C., and wherein the vapor pressure changes less than about 10% after leakage of 50% of the initial mixture.

* * * * *